US008681728B2

(12) United States Patent
Jung et al.

(10) Patent No.: US 8,681,728 B2
(45) Date of Patent: Mar. 25, 2014

(54) APPARATUS AND METHOD OF PREVENTING COMPONENT CARRIER FAILURE PROPAGATION

(75) Inventors: Sunghoon Jung, Gyeonggi-Do (KR); Sungduck Chun, Gyeonggi-Do (KR); Seungjune Yi, Gyeonggi-Do (KR); Youngdae Lee, Gyeonggi-Do (KR); Sungjun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 13/376,828

(22) PCT Filed: Jul. 13, 2010

(86) PCT No.: PCT/KR2010/004537
§ 371 (c)(1),
(2), (4) Date: Dec. 7, 2011

(87) PCT Pub. No.: WO2011/008002
PCT Pub. Date: Jan. 20, 2011

(65) Prior Publication Data
US 2012/0099441 A1      Apr. 26, 2012

Related U.S. Application Data

(60) Provisional application No. 61/225,542, filed on Jul. 14, 2009.

(51) Int. Cl.
*H04W 72/04* (2009.01)
(52) U.S. Cl.
USPC .......................................... 370/329; 370/341

(58) Field of Classification Search
USPC .......................................... 370/216, 242, 329
See application file for complete search history.

(56) References Cited

U.S. PATENT DOCUMENTS

| 7,751,335 | B2 | 7/2010 | Miyazaki |
| 2008/0291826 | A1 | 11/2008 | Licardie et al. |
| 2010/0232382 | A1* | 9/2010 | Gauvreau et al. ............. 370/329 |
| 2010/0296389 | A1* | 11/2010 | Khandekar et al. ........... 370/216 |
| 2011/0305290 | A1* | 12/2011 | Kim et al. ..................... 375/267 |
| 2012/0099464 | A1* | 4/2012 | Chun et al. ................... 370/252 |

OTHER PUBLICATIONS

Nokia Siemens Networks, "Primary Component Carrier Selection, Monitoring, and Recovery," R1-091371, 3GPP TSG RAN WG1 #56-BIS Meeting, Mar. 2009.
CMCC, "Discussions on Carrier Aggregation in RAN2," R2-092411, 3GPP TSG-RAN WG2 Meeting #65bis, Mar. 2009.

* cited by examiner

*Primary Examiner* — Anh-Vu Ly
*Assistant Examiner* — Hashim Bhatti
(74) *Attorney, Agent, or Firm* — Lee, Hong, Degerman, Kang & Waimey (57) ABSTRACT

Disclosed is a mobile communications system employing a plentitude of component carriers and carrier aggregation between a user equipment (UE) and a base station. When failure of any downlink component carrier (DL CC) or uplink component carrier (UL CC) has been detected, the UE transmits UL control signal (e.g., UL HARQ ACK/NACK) to the base station, by re-selecting a CC for UL transmission (e.g., activation of a control channel of a UL CC relating to the DL CC). This may prevent DL CC failure from influencing on a UL CC.

12 Claims, 7 Drawing Sheets

DL HARQ ACK/NACK is received on DL CC1 in response to UL tx on UL CC2

Fig. 9

2) Failure of Reception of DL HARQ ACK /NACK on DL CC1 in response to UL tx on UL CC 2

3) tranmission on UL CC 2 fails ➔ RLF ➔ trigger re-establishment

1) Quality Deterioration detected on DL CC 1

Fig. 10

CC configuration of UE

APPARATUS AND METHOD OF PREVENTING COMPONENT CARRIER FAILURE PROPAGATION

CROSS-REFERENCE TO RELATED APPLICATIONS

This application is the National Stage filing under 35 U.S.C. 371 of International Application No. PCT/KR2010/004537, filed on Jul. 13, 2010, which claims the benefit of U.S. Provisional Application Ser. No. 61/225,542, filed on Jul. 14, 2009, the contents of which are incorporated by reference herein in their entirety.

TECHNICAL FIELD

The present invention relates to a mobile communications system employing a plentitude of component carriers and carrier aggregation, and more particularly, to a method of preventing propagation (influence) of radio link failure detected to have occurred on one component carrier (CC) to (on) other CC, and a terminal thereof.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

The 3GPP LTE uses an orthogonal frequency division multiple access (OFDMA) on a lower link, and uses a single carrier-frequency division multiple access (SC-FDMA) on an upper link. And, the 3GPP LTE adopts a multiple input multiple output (MIMO) system having maximum four antennas. Recently, research on 3GPP LTE-A (LTE-Advanced), an advanced system of the 3GPP LTE is being actively performed.

Techniques applied to the 3GPP LTE-A include carrier aggregation, relay, etc. The 3GPP LTE system is a single carrier system for supporting one bandwidth among '1.4, 3, 5, 10, 15 and 20' MHz, i.e., one component carrier. On the other hand, the LTE-A adopts a multiple carrier using carrier aggregation. The component carrier is defined as a center frequency and a bandwidth. In a multiple carrier system, a plurality of component carriers having a bandwidth narrower than an entire bandwidth are used.

Figure 1:
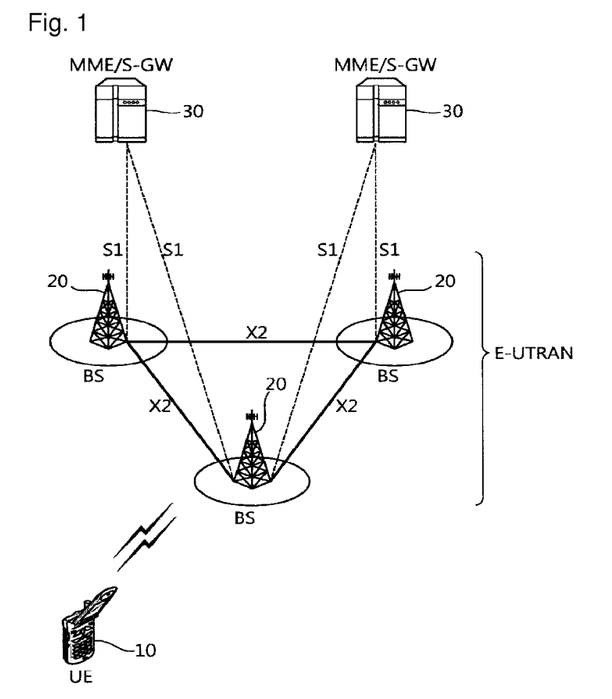
FIG. 1 illustrates a wireless communications system to which the present invention may be applied.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to the eNodeB 20. The UE 10 refers to communication equipment carried by a user and may be also be referred to as a mobile station (MS), a user terminal (UT), a subscriber station (SS) or a wireless device.

The eNodeB 20 provides end points of a user plane and a control plane to the UE 10. MME/SAE gateway 30 provides an end point of a session and mobility management function for the UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

Figure 2:
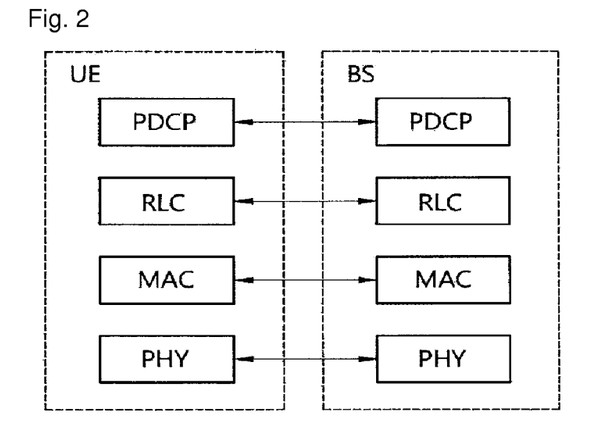
FIG. 2 is a block diagram illustrating a wireless protocol structure with respect to a user plane.
Figure 3:
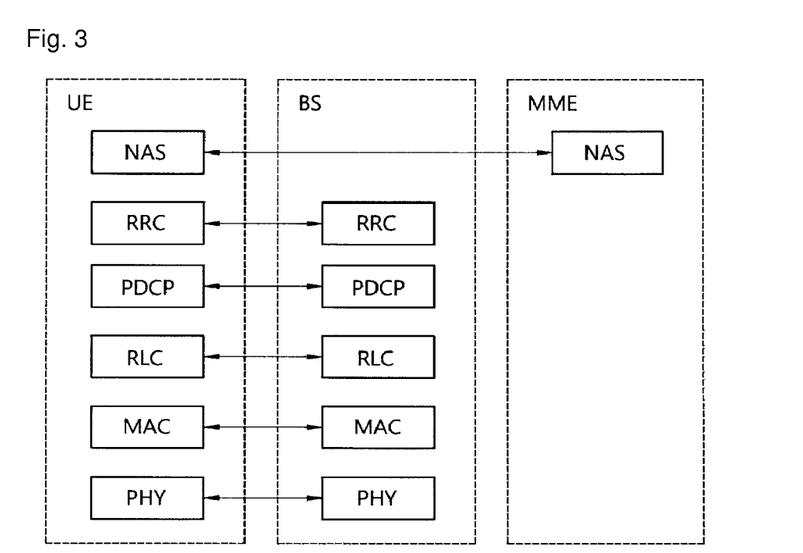
FIG. 3 is a block diagram illustrating a wireless protocol structure with respect to a control plane.

FIG. 2 is a block diagram illustrating a wireless protocol structure with respect to a user plane, and FIG. 3 is a block diagram illustrating a wireless protocol structure with respect to a control plane. A data plane indicates a protocol stack for user data transmission, and a control plane indicates a protocol stack for control signal transmission.

Referring to FIGS. 2 and 3, a physical layer provides an information transmission service to an upper layer by using a physical channel. The physical layer is connected with a medium access control (MAC) layer located at a higher level through a transport channel, and data between the MAC layer and the physical layer is transferred via the transport channel. The transport channel is classified according to a data transfer type in a specific manner through a radio interface.

Data is transferred through the physical channel between different physical layers, i.e., a physical layer of a transmitter and a physical layer of a receiver. The physical channel is modulated in an Orthogonal Frequency Division Multiplexing (OFDM) manner, and utilizes time and a frequency as radio resources.

Functions of the MAC layer include mapping between a logical channel and a transport channel, and multiplexing/demultiplexing of a MAC service data unit (SDU) which belongs to the logical channel into a transport block provided to the physical channel on the transport channel. The MAC layer provides a service to a Radio Link Control (RLC) via a logical channel.

The RLC layer performs concatenation, segmentation and reassembly of an RLC SDU. In order to ensure various qualities of service (QoS) requested by a radio bearer (RB), the RLC layer provides three operation modes including a transparent mode (TM), an unacknowledged mode (UM) and an acknowledged mode (AM). The AM RLC provides error correction through an automatic repeat request (ARID).

Functions of a Packet Data Convergence Protocol (PDCP) layer on the user plane include user data transfer, header compression, and ciphering. And, the function of a Packet Data Convergence Protocol (PDCP) layer on the user plane includes transfer of control plane data, and ciphering/integrity protection.

A Radio Resource Control (RRC) layer is defined only on the control plane. The RRC layer controls a logical channel, a transport channel, and a physical channel with respect to configuration, re-configuration, and release of radio bearers (RBs). The RB indicates a logical path provided by a first layer (PHY layer) and, a second layer (MAC layer, RLC layer and PDCP layer) for data transfer between a UE and a network. RB establishment indicates that a radio protocol layer and a channel characteristic are defined and each parameter and operation are configured so as to provide a specific service. The RB may be divided into a Signaling RB (SRB) and a Data RB (DRB). The SRB is used as a path for transferring an RRC message on a control plane, whereas the DRB is used as a path for transferring a user data on a user plane.

When RRC connection is implemented between an RRC layer of a UE and an RRC layer of an E-UTRAN, the UE is in an RRC_CONNECTED state. Otherwise, the UE is in an RRC_IDLE state.

A downlink transport channel through which data is transferred to a UE from a network includes a Broadcast Channel (BCH) for transferring system information, and a downlink Shared Channel (SCH) for transferring user traffic or a control message. Traffic or a control message of a downlink multicast or a broadcast service may be transferred through the downlink SCH, or through an additional downlink Multicast Channel (MCH). An uplink transport channel through which data is transferred from the UE to the network includes a Random Access Channel (RACH) for transferring an initial control message, and an uplink SCH for transferring user traffic or a control message.

Logical channels which are upper layers of transportation channels and mapped to the transportation channels include a Broadcast Control Channel (BCCH), a Paging Control Channel (PCCH), a Common Control Channel (CCCH), a Multicast Control Channel (MCCH), a Multicast Traffic Channel (MTCH), etc.

The physical channel consists of a plurality of symbols in time, and a plurality of sub-carriers in frequency. One sub-frame consists of a plurality of symbols in time. One sub-frame consists of a plurality of resource blocks, and one resource block consists of a plurality of symbols and sub-carriers. Each sub-frame may use specific sub-carriers of specific symbols (e.g., first symbol) of a corresponding sub-frame for a Physical Downlink Control Channel (PDCCH), i.e., an L1/L2 control channel. A transmission time interval (TTI), a unitary time during which data is transferred is '1 ms' corresponding to one sub-frame.

Hereinafter, an RRC state and an RRC connection of a UE will be explained in more detail.

The RRC state indicates whether an RRC layer of a UE is logically connected with an RRC layer of an E-UTRAN or not. If the RRC layer of the UE is logically connected with the RRC layer of the E-UTRAN, the state is referred to as an RRC_CONNECTED state). On the other hand, if the RRC layer of the UE is not logically connected with the RRC layer of the E-UTRAN, the state is referred to as an RRC_IDLE state. The UE in the RRC_CONNECTED state has an RRC connection. Accordingly, the E-UTRAN can check whether the corresponding UE exists or not as a cell unit, and thus effectively control the UE. On the other hand, the UE in the RRC_IDLE state can not be checked by the E-UTRAN, but can be managed by a core network as a tracking area unit, a unit of a region larger than a cell. More concretely, whether the UE in the RRC_IDLE state exists or not can be checked only as a large area unit, and the UE in the RRC_IDLE state has to transit to the RRC_CONNECTED state so as to be provided with a general mobile communications service such as voice or data.

When a user turns on a UE, the UE searches a suitable cell and then is in an RRC_IDLE state in the corresponding cell. The UE in the RRC_IDLE state is RRC-connected with the E-UTRAN when necessary through an RRC connection procedure, and transits to the RRC_CONNECTED state. The UE in the RRC_IDLE state is required to have RRC connection in the following cases. For instance, when uplink data transfer due to a user's call attempt is required, or when message transmission in response to a paging message from the E-UTRAN is required, the RRC connection is executed.

A Non-Access Stratum (NAS) layer, an upper layer of the RRC layer executes functions such as session management and mobility management.

For the UE's mobility management by the NAS layer, an EPS Mobility Management-REGISTERED (EMM-REGISTERED) state and an EMM-DEREGISTERED state are defined. These two states are applied to the UE and an MME. The initial UE is in an EMM-DEREGISTERED state, and registers, through an initial attach procedure, to a network for connection to the network. Once the attach procedure is successfully executed, the UE and the MME are in the EMM-REGISTERED state.

For management of signaling connection between the UE and an EPC, an EPS Connection Management (ECM)-IDLE state and an ECM-CONNECTED state are defined. These two states are applied to the UE and the MME. When the UE in the ECM-IDLE state has RRC connection with the E-UTRAN, the UE is in the ECM-CONNECTED state. When the MME in the ECM-IDLE state has S1 connection with the E-UTRAN, the MME is in the ECM-CONNECTED state. When the UE is in the ECM-IDLE state, the E-UTRAN does not have context information of the UE. Accordingly, the UE in the ECM-IDLE state executes a UE-based mobility procedure such as cell selection or reselection without being instructed by a network. On the other hand, when the UE is in the ECM-CONNECTED state, the UE's mobility is managed by a command from the network. If a current position of the UE in the ECM-IDLE state is different from a position recognized by the network, the UE informs its position to the network through a tracking area update procedure.

Hereinafter, radio link failure will be explained.

The UE continuously executes measurements so as to maintain quality of a radio link with a serving cell which is receiving a service. The UE determines whether the current state is a service impossible state due to quality deterioration of the radio link with the serving cell. If the current quality of the serving cell is too deteriorated to implement communications, the UE determines the current state as 'radio link failure'.

If the current state is determined as 'radio link failure', the UE does not maintain the communicated state with the serving cell any longer, but selects a new cell through a cell selection (or reselection) procedure. Then, the UE tries an RRC connection re-establishment procedure to the new cell.

Figure 4:
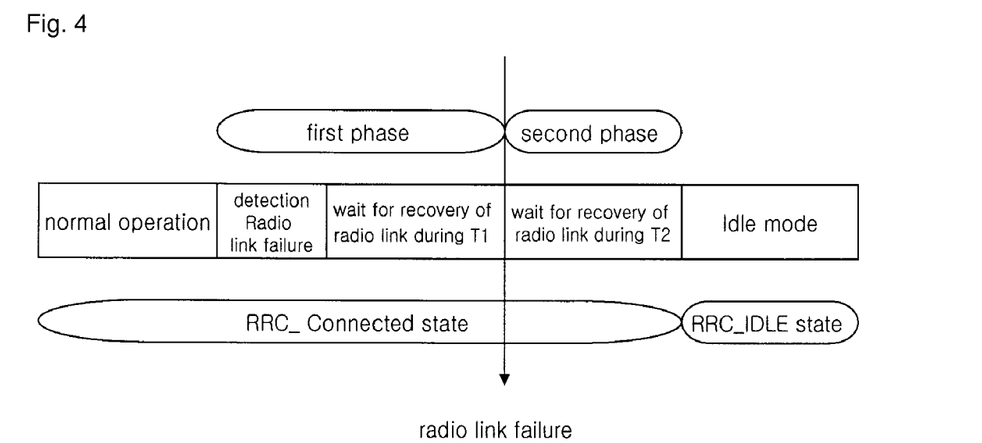
FIG. 4 is an exemplary view illustrating radio link failure.

FIG. 4 is an exemplary view illustrating radio link failure. Operations relating to the radio link failure may be described according to two phases.

According to the first phase, the UE is in a normal operation state, and checks whether a problem has occurred on a current communication link. If the occurrence of a problem is detected, the UE determines that the current communication link is in a radio link problem, and waits for recovery of the radio link during a first standby time (T1). If the radio link is recovered before the first standby time lapses, the UE executes a normal operation again. On the other hand, if the radio link is not recovered until the first standby time is expired, the UE determines that radio link failure has occurred and enters the second phase.

According to the second phase, the UE attempt to re-establish RRC connection by performing re-establishment procedure for recovery of the radio link during a second standby time (T2). If the radio link is not recovered until the second standby time is expired, the UE enters an RRC_IDLE state.

The RRC connection re-establishment procedure indicates a procedure of re-establishing RRC connection in an RRC_CONNECTED state. Since the UE does not enter an RRC_IDLE state, the UE does not initialize any connection establishments such as radio bearer establishment. Rather, the UE temporarily suspends usage of other radio bearers except for an SRB when starting an RC connection re-establishment procedure. If the RRC connection re-establishment procedure is successful, the UE resumes the suspended usage of the radio bears.

Hereinafter, a multiple carrier system will be explained.

A 3GPP LTE system supports a case where a downlink bandwidth and an uplink bandwidth are different configured. This is implemented under an assumption of one component carrier (CC). The CC is defined as a center frequency and a bandwidth. This means that the 3GPP LTE system is supported only in a case that a downlink bandwidth and an uplink bandwidth are equal to each other or different from each other, in a state that one CC is defined with respect to each of an upper link and a downlink. For instance, the 3GPP LTE system supports 20 MHz to the maximum, and supports one CC to each of an uplink and a downlink even if an uplink bandwidth and a downlink bandwidth may be different from each other.

One CC may correspond to one cell. A carrier frequency corresponds to a center frequency of a CC, or a center frequency of a cell. Accordingly, if the UE supports a plurality of CCs, data can be transmitted or received to/from the plurality of CCs corresponding to a plurality of serving cells.

Spectrum aggregation (bandwidth aggregation or carrier aggregation) indicates supporting a plurality of CCs. The spectrum aggregation is implemented so as to support throughput increase, to prevent cost increase due to a wideband radio frequency (RF) device, and to ensure compatibility with the conventional system.

Figure 5:
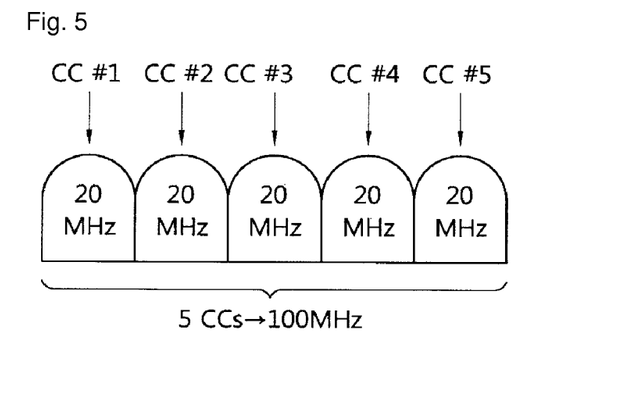
FIG. 5 illustrates one example of a multiple carrier.

FIG. 5 illustrates one example of a multiple carrier. The multiple carrier includes five component carriers (CC #1, CC #2, CC #3, CC #4 and CC #5), and each CC has a bandwidth of 20 MHz. Accordingly, if five CCs are allocated in a granular manner of a CC having a bandwidth of 20 MHz, a maximum bandwidth of 100 Mhz can be supported.

The bandwidth or the number of the CC is merely exemplary. Accordingly, each CC may have a different bandwidth, and the number of downlink CCs may be equal to or different from the number of uplink CCs.

Figure 6:
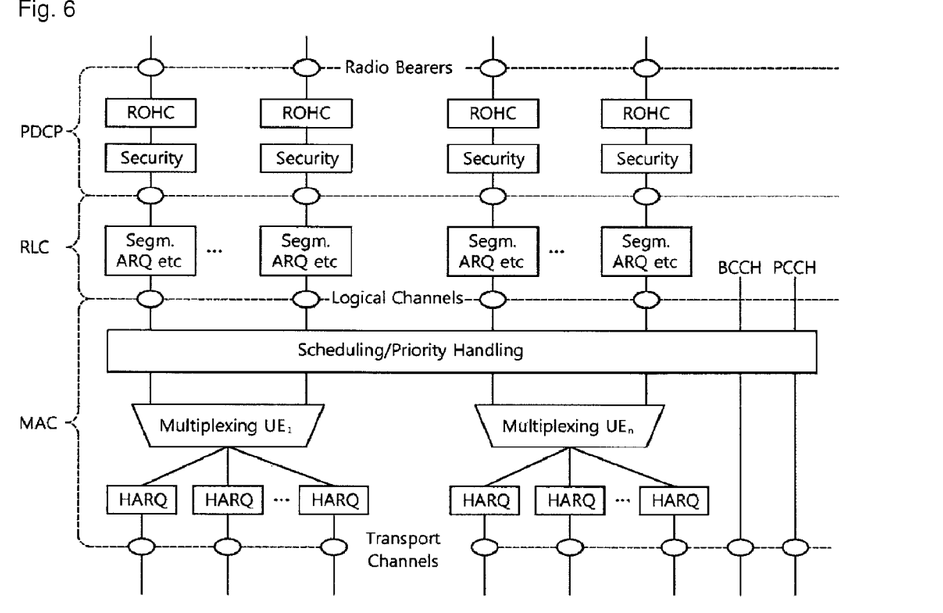
FIG. 6 illustrates a structure of a second layer of a base station for a multiple carrier.
Figure 7:
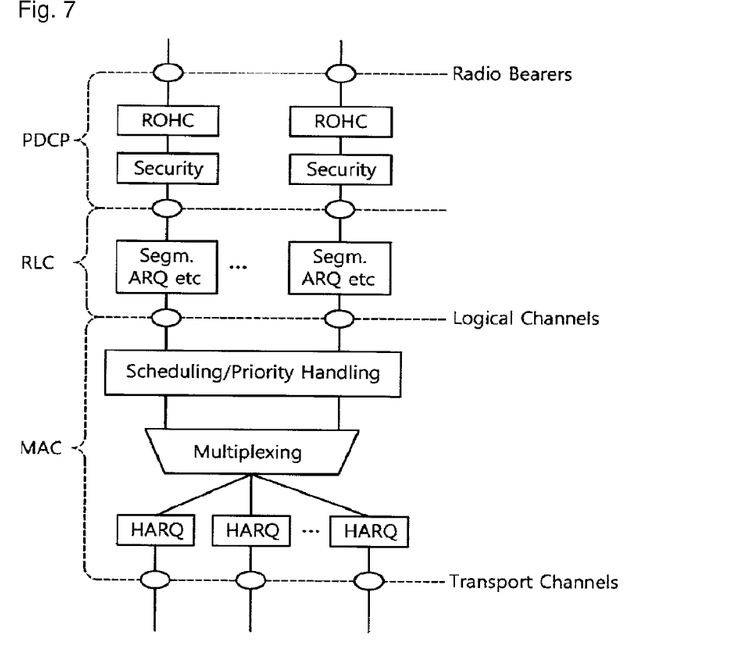
FIG. 7 illustrates a structure of a second layer of a user equipment for a multiple carrier.

FIG. 6 illustrates a structure of a second layer of a base station for a multiple carrier, and FIG. 7 illustrates a structure of a second layer of a user equipment for a multiple carrier.

A MAC layer may manage one or more CCs. One MAC layer includes one or more HARQ entities. One HARQ entity executes hybrid automatic repeat request (Hybrid ARQ or HARQ) with respect to one CC. Each HARQ entity independently processes a transport block on a transport channel. Accordingly, a plurality of HARQ entities may transmit or receive a plurality of transport blocks on a plurality of CCs.

In the conventional art, when quality deterioration or failure of any downlink CC has been detected by the UE, the failure of the downlink CC may propagate (or influence) to (on) an uplink CC. This may cause the UE or the base station to determine that unnecessary radio link failure has occurred. Furthermore, the UE executes an RRC connection re-establishment procedure for recovery of the radio link failure, resulting in waste of radio resources.

DISCLOSURE OF INVENTION

Solution to Problem

Therefore, it is an object of the present invention to provide a method of preventing influence of failure of a radio link detected to have occurred on one component carrier (CC) on other CC, and a terminal thereof.

To achieve these and other advantages and in accordance with the purpose of the present invention, as embodied and broadly described herein, there is provided a method of managing radio link component carriers in a wireless communications system employing carrier aggregation, the method comprising: detecting one or more component carriers where quality deterioration has occurred, wherein quality deterioration includes radio link failure; and deactivating each data channel relating to the detected one or more component carriers.

Preferably, the radio link may be an uplink or a downlink.

Preferably, the method may further comprise maintaining an activated state of each control channel relating to the detected one or more component carriers, and transmitting an uplink (UL) control signal (e.g., uplink HARQ ACK/NACK signal or downlink HARQ ACK/NACK signal) to the activated control channel.

Preferably, the method may further comprise receiving, by a user equipment (UE, or terminal), from a base station, an indicator instructing activation or deactivation of the control channel of the component carrier, and activating or deactivating the control channel of the component carrier based on a value of the indicator.

To achieve these and other advantages and in accordance with the purpose of the present invention, as embodied and broadly described herein, there is also provided a method of preventing propagation of quality deterioration (e.g., radio link failure), capable of preventing radio link failure of a downlink component carrier from influencing on a radio link of an uplink component carrier in a wireless communications system where a plurality of components carriers are allocated between a base station and a UE, the method comprising: detecting, by the UE, quality deterioration (e.g., radio link failure) of a downlink component carrier (DL CC); deactivating, by the UE, a data channel of an uplink component carrier (UL CC) relating to the detected DL CC; and transmitting, by the UE, uplink control signal to the base station on a control channel of the related UL CC, wherein the uplink control signal includes uplink HARQ ACK/NACK signal.

Preferably, the data channel may be a physical uplink shared channel (PUSCH), and the control channel may be a physical uplink control channel (PUCCH).

Preferably, the method may further comprise: receiving, by the UE, from the base station, information instructing activation or deactivation of the control channel of the DL CC; checking, by the UE, whether the information exists or not when the UE has detected radio link failure of the DL CC; and activating or deactivating, by the UE, the control channel of the UL CC based on the information when the information exists. According to another aspect of the present invention, there is provided a method of preventing propagation of radio link failure in a wireless communications system where a plurality of components carriers are allocated between a base station and a UE, the method comprising: receiving, by the UE, from the base station, information on an uplink component carrier (UL CC) additionally allocated so as to prevent radio link failure of a downlink component carrier (DL CC) from influencing on a radio link of the UL CC; detecting, by the UE, radio link failure of the DL CC; and transmitting, by the UE, uplink ACK/NACK to the base station, on the UL CC included in the information transmitted to the UE from the base station.

Preferably, the information on the additionally allocated UL CC may be transmitted to the UE from the base station through dedicated signaling or broadcast signaling.

To achieve these and other advantages and in accordance with the purpose of the present invention, as embodied and broadly described herein, there is also provided a user equipment (UE, or a terminal), comprising: a plurality of antennas configured to receive each component carrier (CC) of carrier aggregation; a receiver configured to receive data transmitted from a base station on one or more downlink DL CCs; a transmitter configured to transmit data to a base station on one or more UL CCs; and a processor configured to detect radio link failure of the DL CC, and configured to deactivate a data channel of the related UL CC when quality deterioration (e.g., radio link failure) of the DL CC has been detected, while keeping activating a control channel of related UL CC.

Preferably, when quality deterioration (e.g., radio link failure) of the DL CC has been detected, the processor may control to transmit control signal (e.g., HARQ ACK/NACK) on the control channel of the UL CC in response to the data received from the base station. This may prevent the detected quality deterioration (e.g., radio link failure) of the DL CC from influencing on a radio link of the UL CC.

Preferably, when quality deterioration (e.g., radio link failure) of the DL CC has been detected, the processor may check whether there is information on resources additionally allocated by the base station (e.g., supplement UL CC information), or information instructing activation or deactivation of the control channel of the UL CC (e.g., 'Linked CC control channel deactivation indicator'). Then, the processor may transmit control signal (e.g., HARQ ACK/NACK) to the base station) based on the information.

Preferably, when quality deterioration (e.g., radio link failure) of the DL CC has been detected, the processor may autonomously deactivate the related UL CC (both data channel and control channel of the UL CC).

The present invention may have the following advantageous effects.

Firstly, when quality deterioration or failure of any DL CC has been detected by the UE, failure of the DL CC may be prevented from influencing on a UL CC.

Secondly, the UE may not perform unnecessary determination on radio link failure since influence of CC failure can be prevented. This may allow the UE not to execute an RRC connection re-establishment procedure required to recover radio link failure.

MODE FOR THE INVENTION

Reference will now be made in detail to the preferred embodiments of the present invention, examples of which are illustrated in the accompanying drawings.

The present invention is applied to a Digital Rights Management (DRM) system. However, the present invention is not limited to the DRM system, but may also be applied to all communications systems and methods thereof to which the technical scope of the present invention may be applied, and other copyrights related system and method thereof.

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Reference will now be given in detail to the preferred embodiments of the present invention, examples of which are illustrated in the accompanying drawings. Wherever possible, the same reference numerals will be used through the drawings to refer to the same or similar parts, and the same descriptions thereof are omitted.

Hereinafter, technical terms used in the present invention will be explained.

An uplink HARQ ACK/NACK (or uplink ACK/NACK) indicates a feedback signal transmitted to an uplink by a user equipment (UE, or terminal), in response to transmission from a base station to a downlink. A downlink HARQ ACK/NACK (or downlink ACK/NACK) indicates a feedback signal transmitted to the downlink by the base station, in response to transmission from the UE to the uplink. The ACK/NACK feedback may be implemented on an MAC layer, or on an RLC layer.

Hereinafter, a component carrier (CC) configuration of the UE with respect to an uplink and a downlink will be explained. Here, 'DL CC' indicates a downlink CC, and 'UL CC' indicates an uplink CC.

The arrow connected from 'DL CC#A' to 'UL CC#B' indicates that the UE transmits a HARQ feedback to an uplink CC#B when the base station has transmitted data on a downlink CC#A. Similarly, the arrow connected from 'UL CC#C' to 'DL CC#D' indicates that the base station transmits a HARQ feedback to a downlink CC#D when the UE has transmitted data on an uplink CC#C.

'Radio link failure' indicates just one example of a CC's degradation or deterioration in quality, so called 'quality deterioration' (e.g., in case when QoS is lower that threshold for some time). Additionally, the CC failure (or CC degradation or CC deterioration) refers to a state that a channel allocated to or corresponding to a component carrier (CC) can not transmit or receive data, or a state that the channel has quality deterioration.

Figure 8:
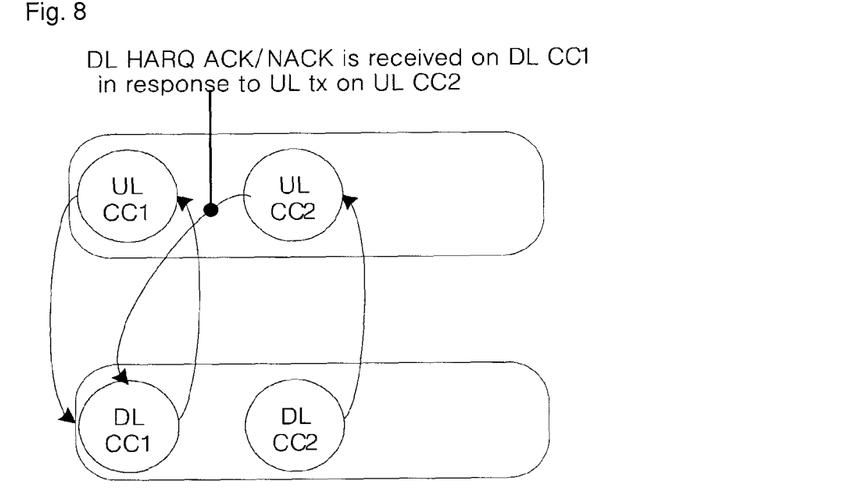
FIG. 8 illustrates one example of component carrier (CC) configuration of a UE.

FIG. 8 illustrates one example of component carrier (CC) configuration of the UE.

Referring to FIG. 8, the arrow connected from 'DL CC1' to 'UL CC1' indicates that the UE transmits a HARQ feedback on a UL CC1 when the base station has transmitted data on a DL CC1. And, the arrow connected from 'DL CC 2' to 'UL CC 2' indicates that the UE transmits a HARQ feedback on the UL CC1 when the base station has transmitted data on a DL CC2.

If any downlink CC has failed in the CC configuration of FIG. 8, the UE can not receive HARQ ACK/NACK with reliability on the DL CC. Here, the CC failure refers to a state that a channel allocated to or corresponding to a component carrier (CC) can not transmit or receive data, or a state that the channel has quality deterioration.

If any UL CC has transmitted HARQ ACK/NACK on a failed DL CC of the UE, the UE fails to receive the HARQ ACK/NACK due to the failed DL CC, even if the UE can transmit data on the UL CC. The UE which has failed to receive the HARQ ACK/NACK continues trying to transmit data on the UL CC, but continuously fails to transmit the data.

The repeated transmission failure on the MAC layer causes re-transmission on the RLC layer. However, the RLC layer also fails to re-transmit data due to the failure of the DL CC for reception of the HARQ ACK/NACK. The UE having repeatedly failed to transmit data to the uplink determines radio link failure according to a radio link failure determination reference (e.g., the number of maximum times of RLC re-transmission).

The UE having determined the radio link failure executes an RRC connection re-establishment procedure. Since it takes a lot of time to complete the RRC connection re-establishment procedure, long interruption may occur during a service of the UE. The UE having executed the RRC connection re-establishment procedure has to resume a service by being connected to only one cell, and has to execute again an RRC connection re-establishment procedure for carrier aggregation (CA) from the connected cell. Since the CA is restricted during the procedure, the UE which is receiving a service of high quality through the CA may receive a service of deteriorated quality.

Figure 9:
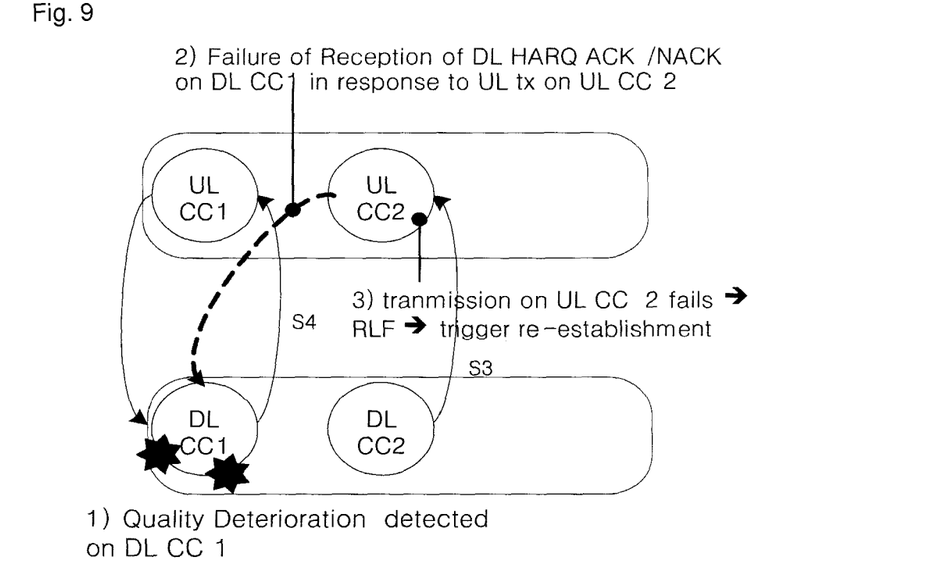
FIG. 9 is a view illustrating influence of downlink 1 (DL CC1) failure on an uplink 2 (ULCC2) in FIG. 8.

FIG. 9 is a view illustrating influence of downlink 1 (DL CC1) failure on an uplink 2 (ULCC2) in FIG. 8. It is assumed that failure of 'CC1' of FIG. 9 has been detected whereas failure of 'CC2' has not been detected.

Hereinafter, the influence (propagation) of CC failure (i.e., CC degradation or CC deterioration) will be explained in more detail with reference to FIG. 9.

The UE fails to receive data from the base station due to failure of the DL CC1 (or quality deterioration) (S1). Accordingly, the UE can not receive a DL HARQ feedback signal, sent on DL CC1, transmitted to the UE from the base station due to the failure of the DL CC1 (or quality deterioration) (S2).

Since a CC2 is in a good state, the UE may send data to the base station on the UL CC2. Due to the failure (or quality deterioration) of the DL CC1, reception of DL HARQ feedback on the DL CC1 in response to UL transmission on a UL CC2 also fails (S4). This causes failure of MAC layer uplink transmissions (including re-transmissions) on UL CC2.

The re-transmission failure on the MAC layer causes re-transmission on the RLC layer. However, if the RLC layer also fails to re-transmit data, the UE determines that transmission to the UL CC2 is impossible, and determines rail link failure. Then, the UE executes an RRC connection re-establishment procedure.

As aforementioned, the failure of the DL CC1 of FIG. 9 may influence on (propagate to) failure of the UL CC2. More concretely, the UE has to execute procedures of re-transmission on the RLC layer, and RRC connection re-establishment due to radio link failure, which may cause waste of resources.

The present inventor proposes a method capable of solving a problem that DL CC failure influences on UL CC failure, by configuring the UE to re-select a CC for UL transmission when any DL CC (or UL CC) has failed.

The basic concept of the present invention is as follows.

Once any DL CC has failed, the UE checks whether there is a UL CC configured to use a control channel (e.g., transmitting HARQ ACK/NACK) to the DL CC. If there is a UL CC, usage of a physical common data channel (e.g., PUSCH) of the UL CC is stopped. Even if the UE stops using the physical common data channel of the UL CC due to the DL CC failure, the UE continues to use a physical common control channel (e.g., PUCCH) of the UL CC. The reason is because other DL CC can use the control channel of the UL CC (e.g., to transmit UL HARQ ACK/NACK).

Figure 10:
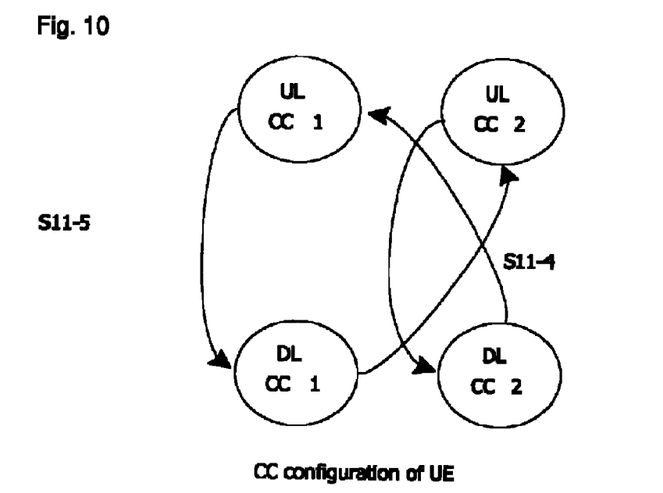
FIG. 10 is a view illustrating a CC configuration of a UE according to a first embodiment of the present invention.

FIG. 10 is a view illustrating a CC configuration of the UE according to a first embodiment of the present invention. As shown in FIG. 10, it is assumed that a multiple carriers are used between the base station and the UE, and only CC1 and CC2 have been configured. More concretely, if the UE receives data on a DL CC1 from the base station, the UE transmits DL HARQ ACK/NACK to the base station on a UL CC2. If the UE receives data on a DL CC2 from the base station, the UE transmits DL HARQ ACK/NACK to the base station on a UL CC1.

If the DL CC1 has failed or quality deterioration has occurred in case of the CC configuration of the UE as shown in FIG. 10, the UE may fail to transmit data on UL CC1 because the UE cannot receive DL HARQ ACK/NACK on DL CC1 for the uplink transmission. If entire UL CC1 is considered failed (or considered as quality deterioration), data transmission from base station to UE to DL CC2 fails unexpectedly because the UE fails to transmit HARQ ACK/NACK on UL CC1 in response to the data transmission on DL CC2 even if the UE may successfully receives data on the DL CC2 from the base station. This may cause re-transmission on the RLC layer, and cause the UE to execute an RRC connection re-establishment procedure due to a totally unnecessary radio link failure.

Figure 11:
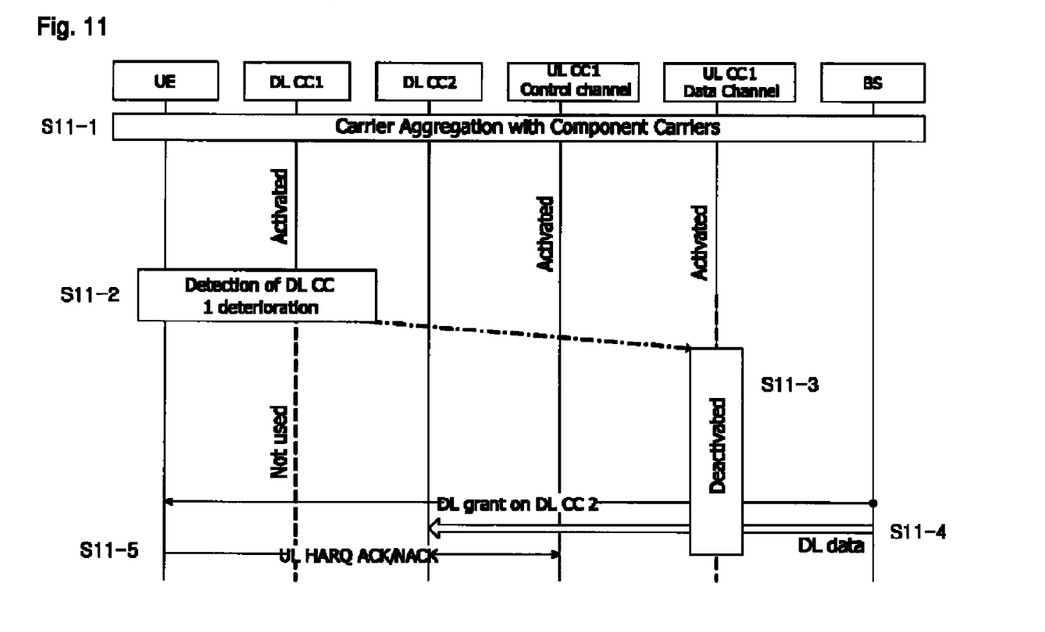
FIG. 11 is a view illustrating a method of preventing influence of failure of a specific component carrier (CC) on other CC in a system using a multiple carrier according to a first embodiment of the present invention.

FIG. 11 is implemented under assumption of the CC configuration of the UE of FIG. 10. FIG. 11 is a view illustrating a method of preventing influence of failure of a specific component carrier (CC) on other CC in a system using a multiple carrier according to a first embodiment of the present invention. It is assumed that carrier aggregation with CC1 and CC2 has been configured between the UE and the base station in FIG. 11 (S11-1).

FIG. 11 illustrates an example to stop using a data channel of a UL CC1 when failure of a DL CC1 has been detected. As shown in FIG. 11, once failure of the DL CC1 has been detected (S11-2), a data channel of the UL CC1 is deactivated (S11-3) whereas a control channel of the UL CC1 is activated. Accordingly, the UE transmits HARQ ACK/NACK to the control channel of the UL CC1 (S11-5 of FIGS. 10 and 11) after receiving data on a DL CC2 from the base station (S11-4 of FIGS. 10 and 11). That is, when the UE receives data on the DL CC2, the UE can transmit HARQ ACK/NACK to the base station through the control channel of the UL CC1. This may prevent influence of quality deterioration or failure of the DL CC1 (that is, S11-2 of FIG. 11) to the DL CC2, and the UL CC1 for transmission of HARQ ACK/NACK (i.e., S11-4 and S11-5 in FIGS. 10 and 11).

Another embodiment of the present invention will be explained as follows.

If any DL CC has failed in a state that there is a UL CC configured to transmit DL HARQ ACK/NACK on the failed DL CC, the UE ignores information on scheduling to the UL CC. Accordingly, the UE prevents data transmission to the UL CC. This may cause the UE not to try an RRC connection re-establishment procedure due to unnecessary radio link fail determination, which is shown in FIG. 11.

When failure of any DL CC has occurred, the base station may set (establish) the UE in advance so that the UE can autonomously stop using a UL CC for transmission of HARQ ACK/NACK.

Figure 12:
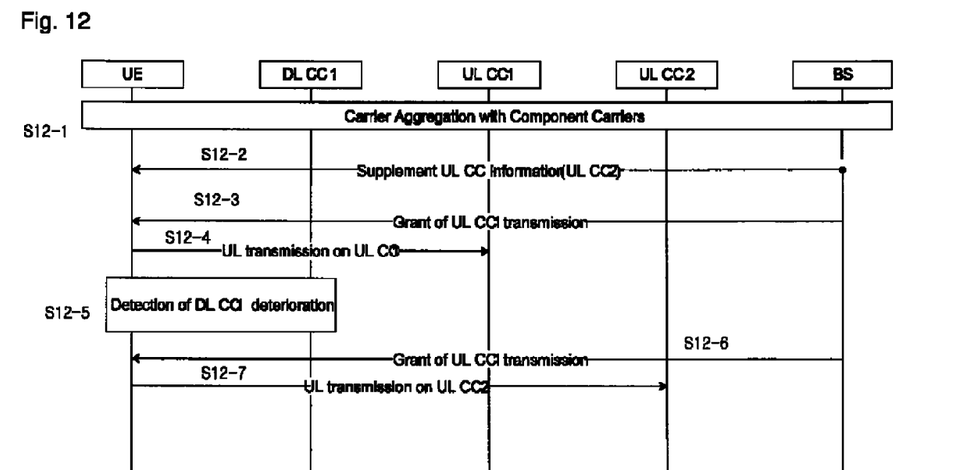
FIG. 12 is a view illustrating a process of re-selecting a UL CC and transmitting information on the UL CC when failure of a DL CC has been detected according to a second embodiment of the present invention.

FIG. 12 is a view illustrating a process of re-selecting a UL CC and transmitting information to the UL CC when failure of a DL CC has been detected according to a second embodiment of the present invention.

Referring to FIG. 12, a physical common data channel resource of each of a plurality of component carriers is allocated with respect to one scheduling information. This will be explained in more detail. More concretely, if the base station has a policy to allocate physical common data channel resources to a plurality of component carriers (CCs) with respect to one scheduling information, the UE may autonomously bypass UL transmission to other UL CC for transmission of HARQ ACK/NACK to other DL CC which has not failed. In case of using this policy, the base station transmits in advance, to the UE, information on the UL CC for bypass transmission. This information may be referred to as 'Supplement UL CC information'. The base station may transmit this information to the UE through dedicated signaling or broadcast signaling.

FIG. 12 illustrates an example to re-select a UL CC for UL transmission based on information on redundant UL CCs previously received from the base station, and then to try UL transmission after the UE detects quality deterioration of a DL CC.

More concretely, resources are allocated between the UE and the base station in the form of a plurality of component carriers (i.e., carrier aggregation) (512-1). The base station additionally allocates UL resources (e.g., UL CC2 of FIG. 12) with respect to specific scheduling information of the UE, and informs the allocation to the UE (S12-2). In S12-2, the base station transmits, to the UE, information on the supplemented UL resources (i.e., resources of the UL CC2 of FIG. 12), that is, supplement UL CC information.

The UE receives downlink data from the base station on a DL CC1. Here, transmission of HARQ ACK/NACK with respect to the DL CC1 on a UL CC1 is scheduled or resource allocation is executed between the UE and the base station (S12-3). Accordingly, the UE receives data from the base station on the DL CC1, and then transmits HARQ ACK/NACK with respect to the data received on the UL CC1 (granted UL CC1) (S12-4). The UE may detect quality deterioration or failure of the DL CC1 according to a channel environment or a channel condition (S12-5). In this case, the UE can not transmit HARQ ACK/NACK to the UL CC1 even if the UE has received data from the base station on the DL CC1. However, supplement resources (i.e., UL CC2) with respect to one scheduling information are allocated between the UE and the base station. Accordingly, the UE may re-select a UL CC2 with respect to data received from the base station on the DL CC1, and may transmit HARQ ACK/NACK through the re-selected channel resources, i.e., the UL CC2 (S12-6 and S12-7).

Figure 13:
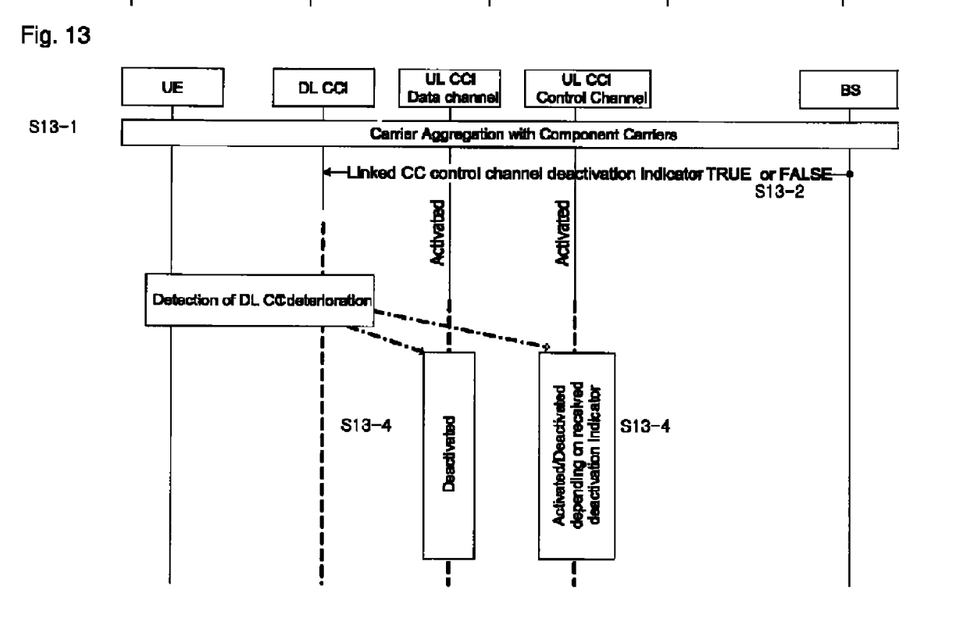
FIG. 13 is a view illustrating a process of activating or deactivating a data channel of a UL CC1 for transmission of DL HARQ ACK/NACK when failure of a DL CC1 has been detected according to a third embodiment of the present invention.

FIG. 13 is a view illustrating a process of activating or deactivating a data channel of a UL CC1 for transmission of a downlink HARQ ACK/NACK when failure of a DL CC1 has been detected according to a third embodiment of the present invention.

The third embodiment of FIG. 13 is different from the first embodiment of FIG. 11 in that the UE deactivates a data channel of the UL CC1, and activates or deactivates a control channel of the UL CC1 based on specific information ('Linked CC control channel deactivation indicator') when failure of the DL CC1 has been detected.

The third embodiment of FIG. 13 may be applied to the following case. For instance, if the base station determines that usage of a control channel of the UL CC by the UE increases scheduling complexity in a state that usage of a data channel of the UL CC has been stopped, the base station may control the UE to completely stop using the UL CC (e.g., stop using both the data channel and the control channel of the UL CC) through an autonomous deactivation technique. That is, the base station may configure the UE in advance through dedicated signaling or broadcast signaling, so that the UL CC (e.g., the data channel and the control channel of the UL CC1 of FIG. 13) can be completely deactivated. If failure of a specific DL CC (DL CC1) has been detected, the base station transmits, to the UE, information (or indicator) indicating whether to activate or deactivate the control channel of the UL CC (i.e., UL CC1) for transmission of DL HARQ ACK/NACK. Here, the indicator may be referred to as 'Linked CC Control Channel Deactivation indicator' for convenience. The indicator is a command or information transmitted to the UE by the base station, and may be transmitted to the UE by being included in a dedicated message or a common message between the base station and the UE (S13-2). And, the indicator may be set as 'TRUE' (or '1') or 'False' (or '0').

If the UE detects failure of the DL CC in a state that the indicator has been set as 'TRUE' (or '1'), the UE deactivates both the data channel and the control channel of the UL CC for transmission of DL HARQ ACK/NACK.

Hereinafter, detailed explanations will be disclosed with reference to FIG. 13.

It is assumed that carrier aggregation with 'CC1' and 'CC2' has been configured between the UE and the base station (S13-1). The base station transmits, to the UE, an indicator (or information) indicating deactivation of the control channel (S13-2).

The UE receives the indicator, and stores the received indicator in a storage unit (not shown). Upon detection of failure of the DL CC1 (S13-3), the UE checks (or searches) whether the indicator exists or not. Then, the UE deactivates the data channel of the UL CC1 for transmission of DL HARQ ACK/NACK (S13-4). According to a preset value of the indicator, the UE deactivates or activates the data channel of the UL CC1 for transmission of DL HARQ ACK/NACK (S13-4). If the preset value of the indicator is 'TRUE' (or '1'), the UE also deactivates the common control channel of the UL CC1 for transmission of DL HARQ ACK/NACK.

Hereinafter, the UE according to the present invention will be explained with reference to FIG. 14.

Figure 14:
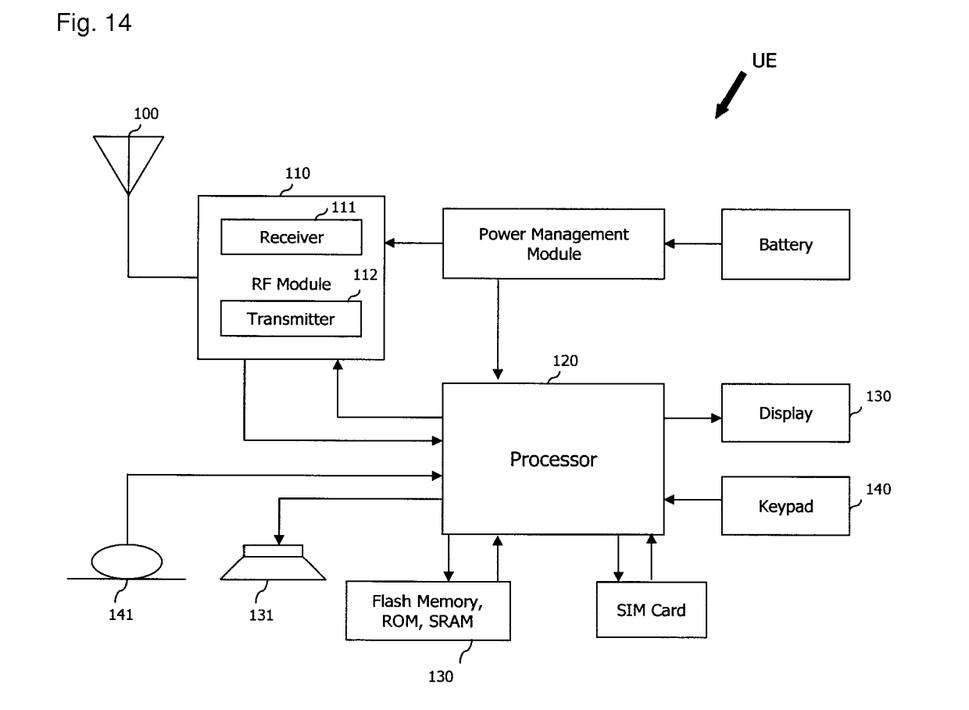
FIG. 14 is a block diagram of a UE according to the present invention.

FIG. 14 is a block diagram of the UE according to the present invention.

The UE according to the present invention constitutes hardware and software which may execute the processes of FIGS. 10 to 13. And, the UE comprises components which can transmit and receive data to/from an uplink and a downlink, through radio resources scheduled with a base station in a system employing carrier aggregation. The components may include a transceiver (or an RF unit) 110, a processor (e.g., a signal processor, a controller, a microprocessor, etc.) and an input/output unit (e.g., an input unit such as a microphone 141, a keypad 140, and a touch screen, and an output unit such as a display 130 and a speaker 131). General functions and operations of the components are obvious to those skilled in the art, and thus their detailed explanations will be omitted. Rather, some components relating to the technical configurations and functions of FIGS. 10 to 13 will be explained for brief explanations of the present invention.

The UE of the present invention is applied to a system using a plurality of frequencies (carrier aggregation). Accordingly, the UE of the present invention comprises a plurality of antennas 100 configured to receive each component carrier of carrier aggregation, a receiver 111 configured to receive data transmitted from a base station on one or more DL CCs, a transmitter 112 configured to transmit HARQ ACK/NACK with respect to the data received on the DL CC to a scheduled UL CC, and a processor 120 configured to detect quality deterioration (or failure) or a channel state of a DL CC (or UL CC), and configured to deactivate a data channel of the scheduled UL CC (e.g., UL CC1) for transmission HARQ ACK/NACK to the DL CC when deterioration or failure of the DL CC (e.g., DL CC1) has been detected, while activating a control channel of the scheduled UL CC (e.g., UL CC1).

The receiver 111 receives, from the base station, information on resources additionally allocated by the base station (e.g., supplement UL CC information), and information (or indicator) instructing activation or deactivation of the control channel of the UL CC (e.g., 'Linked CC control channel deactivation indicator' in FIG. 13).

In a state that quality deterioration or failure of the DL CC has been detected, if data is received from the base station on other DL CC, the processor 120 controls HARQ ACK/NACK with respect to the received data to be transmitted on the activated control channel of the UL CC (i.e., UL CC1).

When quality deterioration or failure of the DL CC has been detected, the processor 120 checks whether there is information on resources additionally allocated by the base station (e.g., supplement UL CC information), or information (or indicator) instructing activation or deactivation of the control channel of the UL CC (e.g., 'Linked CC control channel deactivation indicator' in FIG. 13). Then, the processor 120 transmits HARQ ACK/NACK to the base station based on the information.

The UE of the present invention further comprises a storage unit 130 configured to store therein information transmitted from the base station, i.e., information on resources additionally allocated by the base station (e.g., supplement UL CC information), or information (or indicator) instructing activation or deactivation of the control channel of the UL CC (e.g., 'Linked CC control channel deactivation indicator' in FIG. 13).

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method of managing component carriers in a wireless communications system employing carrier aggregation, the method comprising:

detecting a component carrier where quality deterioration has occurred, wherein quality deterioration includes radio link failure;

deactivating each data channel relating to the detected component carrier;

receiving, by a user equipment (UE), from a base station, an indicator instructing activation of each control channel relating to the detected component carrier; and activating each control channel relating to the detected one or more component carriers based on a value of the indicator.

2. The method of claim 1, wherein the radio link is an uplink or a downlink.

3. The method of claim 1, further comprising:

maintaining an activated state of each control channel relating to the detected component carrier; and transmitting control signal on the activated control channel wherein the control signal includes uplink HARQ ACK/NACK signal or downlink HARQ ACK/NACK signal.

4. A method of preventing propagation of quality deterioration, capable of preventing radio link failure of a downlink component carrier from influencing on a radio link of an uplink component carrier in a wireless communications system where a plurality of component carriers are allocated between a base station and a user equipment (UE), the method comprising:

detecting, by the UE, quality deterioration of a downlink component carrier (DL CC), wherein the quality deterioration includes radio link failure;

deactivating, by the UE, a data channel of an uplink component carrier (UL CC) relating to the detected DL CC while activating a control channel of the related UL CC; and transmitting, by the UE, uplink control signal to the base station on the control channel of the related UL CC, wherein the uplink control signal includes uplink HARQ ACK/NACK signal.

5. The method of claim 4, wherein the data channel is a physical uplink shared channel (PUSCH), and the control channel is a physical uplink control channel (PUCCH).

6. The method of claim 4, further comprising:

receiving, by the UE, from the base station, information instructing activation or deactivation of a control channel of the DL CC;

checking, by the UE, whether the information exists or not when the UE has detected radio link failure of the DL CC; and activating or deactivating, by the UE, the control channel of the UL CC based on the information when the information exists.

7. A method of preventing propagation of quality deterioration in a wireless communications system where a plurality of component carriers are allocated between a base station and a user equipment (UE), the method comprising:

receiving, by the UE, from the base station, information on an uplink component carrier (UL CC) additionally allocated so as to prevent quality deterioration of a downlink component carrier (DL CC) from influencing on a radio link of the UL CC, wherein the quality deterioration includes radio link failure;

detecting, by the UE, radio link failure of the DL CC;

deactivating a data channel of the UL CC included in the information received by the UE from the base station, while activating a control channel of the UL CC; and transmitting, by the UE, uplink control signal to the base station, on the control channel of the UL CC included in the information received by the UE from the base station, wherein the uplink control signal includes uplink HARQ ACK/ NACK signal.

8. The method of claim 7, wherein the information on the additionally allocated UL CC is transmitted to the UE from the base station through dedicated signaling or broadcast signaling.

9. A terminal, comprising:

a plurality of antennas configured to receive each component carrier (CC) of carrier aggregation;

a receiver configured to receive data from a base station on one or more downlink (DL) CCs;

a transmitter configured to transmit uplink control signal with respect to the data received on the DL CC to a scheduled UL CC, wherein the uplink control signal includes uplink HARQ ACK/NACK signal; and a processor configured to detect quality deterioration of the DL CC, and configured to deactivate a data channel of the scheduled UL CC for transmitting the uplink control signal when radio link failure of the DL CC has been detected, while activating a control channel of the scheduled UL CC, wherein the quality deterioration includes radio link failure.

10. The terminal of claim 9, wherein when quality deterioration of the DL CC has been detected, the processor controls to transmit the uplink control signal on the control channel of the UL CC in response to the data received from the base station, such that the detected quality deterioration of the DL CC is prevented from influencing on a radio link of the UL CC.

11. The terminal of claim 9, wherein when quality deterioration of the DL CC has been detected, the processor checks whether there is information on resources additionally allocated by the base station (supplement UL CC information), or information instructing activation or deactivation of the control channel of the UL CC ('Linked CC control channel deactivation indicator'), and the processor transmits the uplink control signal to the base station based on the information.

12. The terminal of claim 9, wherein when quality deterioration of the DL CC has been detected, the processor may autonomously deactivate both the data channel and the control channel of the scheduled UL CC.

* * * * *